United States Patent
Rhawi

(10) Patent No.: US 6,829,472 B2
(45) Date of Patent: Dec. 7, 2004

(54) METHOD FOR SELECTING MOBILE TELEPHONE OPERATOR

(76) Inventor: Sami Rhawi, Drottningsgatan 67 111 36, Stockholm (SE)

( * ) Notice: Subject to any disclaimer, the term of this patent is extended or adjusted under 35 U.S.C. 154(b) by 587 days.

(21) Appl. No.: 09/938,020

(22) Filed: Aug. 23, 2001

(65) Prior Publication Data

US 2002/0028669 A1 Mar. 7, 2002

Related U.S. Application Data

(60) Provisional application No. 60/230,104, filed on Sep. 5, 2000.

(51) Int. Cl.$^7$ .............................................. H04M 11/00
(52) U.S. Cl. ....................................... 455/406; 455/445
(58) Field of Search ................................ 455/405, 406, 455/407, 408, 409, 410, 411, 551, 445, 558, 564; 379/114.19, 114.2, 114.02, 114.01

(56) References Cited

U.S. PATENT DOCUMENTS

2002/0013163 A1 * 1/2002 O'prey ........................ 455/558

FOREIGN PATENT DOCUMENTS

DE   WO 01/28267 A2 *   4/2001
DK   1 051 052 A1 *   8/2000

* cited by examiner

*Primary Examiner*—Rexford Barnie
(74) *Attorney, Agent, or Firm*—Rolf Fasth; Fasth Law Offices

(57) ABSTRACT

The method is for selecting a telephone operator for mobile telephones. The mobile telephone has an operator card installed therein that has preprogrammed codes for providing communication via a first and a second telephone operator. A telephone number is then entered on the mobile telephone to activate the mobile telephone. A first request signal is sent to the first telephone operator and a second request signal is sent to the second telephone operator. The first telephone operator sends back a first response signal to the mobile telephone and the second telephone operator sends back a second response signal to the mobile telephone. A price request signal is sent to the first and second telephone operators. In response to the price request signal, the first telephone operator sends back a first price signal and the second telephone operator sends back a second price signal to the mobile telephone. The first price signal is compared with the second price signal and the first telephone operator or the second telephone operator is selected depending upon whether the first or the second price signal is the lowest.

10 Claims, 1 Drawing Sheet

METHOD FOR SELECTING MOBILE TELEPHONE OPERATOR

This application claims priority from U.S. Provisional Patent Application No. 60/230,104; filed Sep. 5, 2000.

TECHNICAL FIELD

The present invention relates to a method for selecting a mobile telephone operator.

BACKGROUND AND SUMMARY OF THE INVENTION

The use of mobile telephones is still quite expensive and it is difficult for a user of a mobile telephone to know which telephone operator is providing the best price and signalling quality for a particular pending telephone call. The user is often at the mercy of one selected telephone operator and the user cannot conveniently select the best operator for a particular upcoming telephone call. There is a need for a system that enables the user to effectively select the best telephone operator for each telephone call so that the user can easily switch between the various operators. There is also a need for a system that enables the user to maintain the same telephone number while using different telephone operators.

The method of the present invention provides a solution to the above described problems. More particularly, the method is for selecting a telephone operator for mobile telephones. The mobile telephone has an operator card installed therein that has preprogrammed codes for providing communication via a first and a second telephone operator. A telephone number is then entered on the mobile telephone to activate the mobile telephone. A first request signal is sent to the first telephone operator and a second request signal is sent to the second telephone operator. The first telephone operator sends back a first response signal to the mobile telephone and the second telephone operator sends back a second response signal to the mobile telephone. A price request signal is sent to the first and second telephone operators. In response to the price request signal, the first telephone operator sends back a first price signal and the second telephone operator sends back a second price signal to the mobile telephone. The first price signal is compared with the second price signal and the first telephone operator is selected when the first price signal is lower than the second price signal and the second telephone operator is selected when the second price signal is lower than the first price signal.

DETAILED DESCRIPTION

Figure 1:
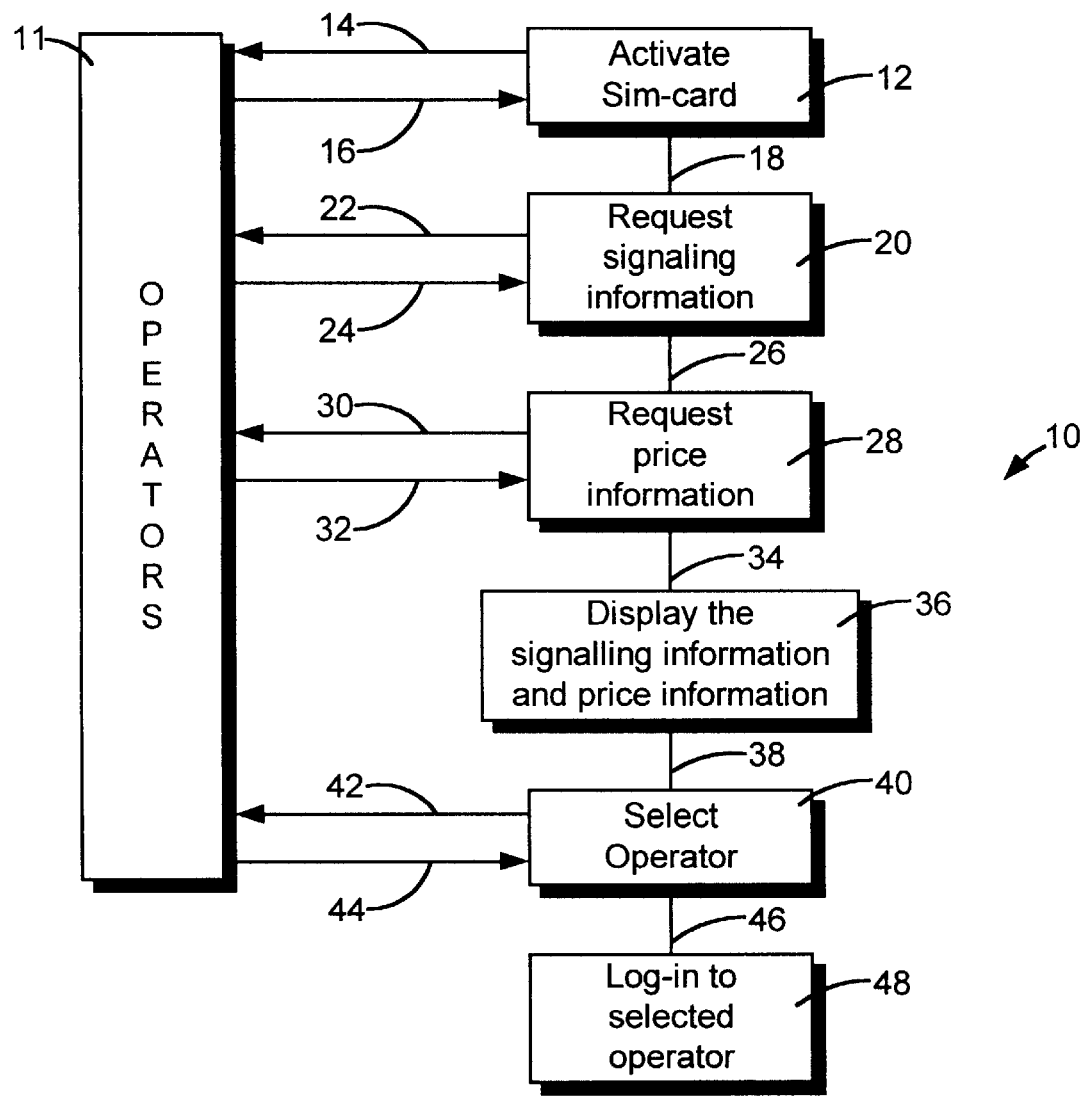
FIG. 1 is a schematic flow diagram of method of the present invention.

With reference to FIG. 1, the present invention is a sophisticated selection method 10 for selecting and very effectively use different mobile telephone operators 11 when making and receiving telephone calls. The networks of telephone operators provide different reception and transmission properties depending partly upon the location of the mobile telephone. Also, the operators 11 charge differently depending upon when, where and to whom the telephone call is made. The selection method 10 has an activation unit 12 for activating a SIM card, including a robot link feature, of the mobile telephone by inserting the SIM card into the mobile telephone. The SIM card is programmed with the required connection codes to all the operators so that the user of the mobile telephone may communicate with and use the telephone networks of more than one operator with the same SIM card. The connection codes to the various telephone operators may be pre-programmed on the SIM card. It may also be possible to update existing connection codes and to add new connection codes, as desired. The SIM card makes it possible to switch between different operators depending upon the specific desires of the user with the same SIM card so there is no need to switch the card when switching operator. For example, the user may select one operator because the operator offers the best price for the particular telephone call or select another operator because the transmission quality is the best for the particular telephone connection.

The subscriber may have different telephone numbers for each subscriber. A feature of the present invention is that the subscriber may have the same telephone number for every operator and that only the unique prefix, such as the mobile phone prefix, for each operator is different depending upon which operator is used for the telephone call. For example, in Sweden the prefixes 0705, 0706 etc. are used before the subscriber's unique telephone number to indicate which operator is used. If only one unique telephone number is used for the subscriber, there may be a registration function that indicate in which network the subscriber is currently logged in. If the mobile telephone is not logged in, the subscriber may have selected one operator to receive the incoming phone call and record a voice mail message.

After the SIM card is properly installed into the mobile telephone and the subscriber has dialed a telephone number, the activation unit 12 may send a validity signal 14 to the operators stored in the SIM card. Each operator 11 receives the validity signal 14 and responds with a response signal 16 to confirm that the operator is still in operation and available. The signal 16 may also confirm that the subscriber has a valid subscription with the particular operator. The unit 12 may then send a request signal 18 to a request unit 20 that requests signalling information from every operator that responded with a positive response signal. In other words, it is not necessary to request information from an operator that did not provide a positive and valid response signal to confirm that the networks of operators are available for telephone calls by the subscriber. A particular operator could also include information about the reason for not responding with a positive response signal. For example, the subscriber may not have paid the telephone bills on time or that the network of the operator is not available during the requested time of use. The mobile phone could be programmed so that the validity signal 14 is automatically sent each time the mobile phone is turned on by the subscriber. The step of searching for the operator that provides the strongest or highest quality signal may be omitted if so desired by the subscriber. For example, the signalling quality is usually not a problem in large cities but only in remote areas in the countryside.

The unit 20 sends a signal information signal 22 to the operators 11 that may respond by sending back a response signal 24. When the signals 24 have been received by the unit 20, the unit 20 may send a request signal 26 to a request unit 28 that transmits a price request signal 30 to the operators 11. Each operator 11 may respond with a response signal 32 containing price information for the requested telephone call such as a price per time period. The response signal 32 may also include information about special discounts during certain time periods for the telephone call that the subscriber is about to make. The signal 30 may also include information about the likely length of the pending telephone call or the signal 32 may include a request for the likely length of the telephone call if there is a special discount for a longer telephone call, such as telephone calls that last longer than 10 minutes.

When the unit 28 has received all the response signals 32, the unit 28 may send a display signal 34 to a display unit 36 that displays the signalling information contained in the response signal 24 and the price information contained in the response signal 32. The information may be displayed according to price and/or signalling quality in a menu, as required by the user of the mobile telephone. Preferably, the SIM card has a default operator and the display unit 28 may only display the list of operators when the default operator is not the best option for the particular phone call that the subscriber would like to make.

The SIM card can also be programmed so that the user may select the search criteria prior to the performance of the search. For example, if the subscriber is only interested in the lowest price regardless of the quality, it is unnecessary to search for the operator that provides the best signalling quality as long as the signal is strong enough to carry out the telephone call.

The display unit 36 may request the user to select an operator by sending a select signal 38 to a selection unit 40. Of course, the user may opt not to make any telephone call at all by pressing a cancel or clear button on the mobile telephone.

When the user has made a selection, the unit 40 sends a connection signal 42 to the selected operator 11 that may respond by sending back a confirmation signal 44. The unit 40 may then transmit a log-in signal 46 to a log-in unit 48 to log-in the mobile phone to the network of the selected operator and the subscriber will be charged for using the network of the selected operator. The method of the present invention may also be used for chargeable telephone cards.

Preferably, the SIM card may be pre-programmed so that incoming telephone calls may channeled through one pre-selected operator as a default operator. It may also be possible to program the SIM card so that the card automatically selects the operator that provides the best reception without asking the user to select the operator.

While the present invention has been described in accordance with preferred compositions and embodiments, it is to be understood that certain substitutions and alterations may be made thereto without departing from the spirit and scope of the following claims.

I claim:

1. A method for selecting a telephone operator for mobile telephones, comprising:
    providing a mobile telephone having an operator card installed therein, the operator card having preprogrammed codes for providing communication via a first and a second telephone operator;
    entering a telephone number on the mobile telephone;
    sending a first request signal to the first telephone operator and a second request signal to the second telephone operator;
    the first telephone operator sending back a first response signal to the mobile telephone;
    the second telephone operator sending back a second response signal to the mobile telephone;
    sending a price request signal to the first and second telephone operators;
    in response to the price request signal, the first telephone operator sending back a first price signal and the second telephone operator sending back a second price signal to the mobile telephone;
    comparing the first price signal with the second price signal;
    selecting the first telephone operator when the first price signal is lower than the second price signal; and
    selecting the second telephone operator when the second price signal is lower than the first price signal.

2. The method according to claim 1 wherein the step of sending a first request signal comprises sending a first signalling request signal to obtain signalling quality information from the first telephone operator.

3. The method according to claim 1 wherein the step of sending a first price signal comprises sending a first discount signal including special discount information for telephone calls lasting longer than a predetermined time period.

4. The method according to claim 1 the method further comprises selecting the first telephone operator for receiving an incoming telephone call when the first telephone operator provides a signalling quality that is better than a signalling quality of the second telephone operator.

5. The method according to claim 1 wherein the method further comprises displaying signalling information contained in the first and second price signals.

6. The method according to claim 1 wherein the method further comprises selecting the first telephone operator as a default telephone operator.

7. The method according to claim 1 wherein the method further comprises sending a first connection request signal to the first telephone operator when the first telephone operator is selected and sending a second request connection signal to the second telephone operator when the second telephone operator is selected.

8. The method according to claim 5 wherein the method further comprises displaying information about signalling qualities of the first and second telephone operator.

9. The method according to claim 1 wherein the method further comprises providing the preprogrammed codes with a first prefix and a first telephone number for receiving calls via the first operator and a second prefix and the same first telephone number for receiving calls via the second operator.

10. The method according to claim 6 wherein the method further comprises displaying a list of telephone operators when the default telephone operator is more expensive than the telephone operators on the list.

* * * * *